(12) United States Patent
Martinez De La Cruz et al.

(10) Patent No.: US 11,582,685 B2
(45) Date of Patent: Feb. 14, 2023

(54) TRANSPARENT NETWORK FUNCTION DISCOVERY AND ADDRESSING

(71) Applicant: Telefonaktiebolaget LM Ericsson (publ), Stockholm (SE)

(72) Inventors: Pablo Martinez De La Cruz, Madrid (ES); David Castellanos Zamora, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 65 days.

(21) Appl. No.: 17/261,274

(22) PCT Filed: Sep. 14, 2018

(86) PCT No.: PCT/EP2018/074986
§ 371 (c)(1),
(2) Date: Jan. 19, 2021

(87) PCT Pub. No.: WO2020/020474
PCT Pub. Date: Jan. 30, 2020

(65) Prior Publication Data
US 2021/0282078 A1    Sep. 9, 2021

(30) Foreign Application Priority Data
Jul. 27, 2018   (EP) .................................... 18382567

(51) Int. Cl.
*H04W 48/16*     (2009.01)
*H04W 8/28*      (2009.01)
(Continued)

(52) U.S. Cl.
CPC ......... *H04W 48/16* (2013.01); *H04L 61/4511* (2022.05); *H04W 8/28* (2013.01); *H04W 84/042* (2013.01)

(58) Field of Classification Search
CPC ..... H04W 84/042; H04W 48/16; H04W 8/28; H04L 61/4511
See application file for complete search history.

(56) References Cited

U.S. PATENT DOCUMENTS

2022/0174521 A1 *   6/2022   Yao ......................... H04L 43/10

OTHER PUBLICATIONS

International Search Report and Written Opinion dated Apr. 29, 2019 for International Application No. PCT/EP2018/074986 filed on Sep. 14, 2018, consisting of 15-pages.
(Continued)

*Primary Examiner* — Diane D Mizrahi
(74) *Attorney, Agent, or Firm* — Christopher & Weisberg, P.A.

(57) ABSTRACT

Embodiments described herein provide methods and apparatus for configuring a service based architecture for discovery of a Network Function, NF. A method in a Network Function Discovery Orchestration includes configuring, in a domain name system, DNS, a first DNS entry associating a first domain name of the NF with at least one NF Internet Protocol, IP, address of the NF, and a second DNS entry associating the first domain name with at least one edge security node IP address of an edge security node in the first PLMN, wherein, the first DNS entry is for use in resolving requests for the NF which originate from within the first PLMN, and the second DNS entry is for use in resolving requests for the NF which originate from outside the first PLMN. Further methods and apparatus in a Network Repository Function, a Domain Name System and an edge security node are also provided.

6 Claims, 16 Drawing Sheets

(51) Int. Cl.
*H04L 61/4511* (2022.01)
*H04W 84/04* (2009.01)

(56) References Cited

OTHER PUBLICATIONS

3GPP TS 23.501 V15.1.0; 3rd Generation Partnership Project; Technical Specification Group Services and System Aspects; System Architecture for the 5G System; Stage 2 (Release 15); Mar. 2018, consisting of 201-pages.
3GPP TS 23.501 V15.0.0; 3rd Generation Partnership Project; Technical Specification Group Services and System Aspects; System Architecture for the 5G System; Stage 2 (Release 15); Dec. 2017, consisting of 181-pages.
3GPP TS 23.502 V15.0.0; 3rd Generation Partnership Project; Technical Specification Group Services and System Aspects; Procedures for the 5G System; Stage 2 (Release 15); Dec. 2017, consisting of 258-pages.
3GPP TS 23.003 V15.4.0; 3rd Generation Partnership Project; Technical Specification Group Core Network and Terminals; Numbering, addressing and identification (Release 15); Jun. 2018, consisting of 120-pages.
3GPP TSG SA WG3 (Security) Meeting #91 S3-181407; Title: SBA: Inter-PLMN routing and TLS issues; Source: Ericsson; Agenda Item: 7.2.13.2; Document for: Discussion; Date and Location: Apr. 16-20, 2018, Belgrade, Serbia, consisting of 3-pages.
Sarath Pillai et al.; Difference between iterative and recursive dns query; Slashroot; Jan. 12, 2013, consisting of 24-pages.
Split-horizon DNS; Wikipedia; Jan. 15, 2018. consisting of 2-pages.

\* cited by examiner

TRANSPARENT NETWORK FUNCTION DISCOVERY AND ADDRESSING

CROSS-REFERENCE TO RELATED APPLICATIONS

This application is a Submission Under 35 U.S.C. § 371 for U.S. National Stage Patent Application of International Application No.: PCT/EP2018/074986, filed Sep. 14, 2018 entitled "TRANSPARENT NETWORK FUNCTION DISCOVERY AND ADDRESSING," which claims priority to European Patent Application No.: 18382567.8, filed Jul. 27, 2018, the entireties of both of which are incorporated herein by reference.

TECHNICAL FIELD

Embodiments described herein relate to methods and apparatus for configuring a service based architecture of network function requesting in roaming and non-roaming scenarios.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The 5G architecture may implement a so-called Service-Based Architecture (SBA) for the core network. In this new architecture, a number of the interfaces within the core network (including roaming interfaces) are to be changed from the legacy telecom style interfaces to modern, web-based application interfaces (APIs). The service based architecture (SBA) allows a Network Function (NF) to expose one or more NF services as a NF service producer to other NFs within the 5GC network as NF service consumers through service based interfaces.

There are several alternatives available for the development and implementation of such an SBA architecture. One possible model is referred to as the Representational State Transfer (REST) architectural model. In this model, the different entities (services, network functions, etc.) in the 5G system may interact with each other by invoking actions on a so-called "resource", which is identified in Hypertext Transfer Protocol (HTTP) by a Uniform Resource Identifier (URI).

Then, the different actions to be invoked in the different system entities may be defined by the different HTTP standard commands (e.g., GET, POST, PUT, DELETE, etc. . . . ), while the HTTP messages may convey representations of the affected resources in the HTTP payload. These representations can be formatted in different data-encoding languages (e.g. JSON).

Unless the information regarding NF service providers is locally configured on the corresponding NF service consumers, e.g. the expected NF service or NF is in the same Public Land Mobile Network (PLMN) as the requesting NF, the NF service consumers discover and select NF service producers dynamically using a Network Repository Function (NRF). The NRF may be a logical function that is used to maintain the NF profile of available instances of NF service producers and their supported services. The NRF may also be used to receive NF service Discovery Requests from NF service consumers, and provide the information of the available instances of corresponding NF service producers to the requesting NF service consumer.

In order to enable access to a requested NF type or NF service, the requester NF initiates the NF or NF service discovery by providing the type of the NF or the specific service that it is attempting to discover (e.g. SMF, PCF, UE location Reporting) and any other service parameters, for example, slicing related information, to the NRF to discover the target NF. The detailed service parameter(s) used for specific NF discovery refer to the related NF discovery and selection clause.

Depending on the chosen message routing model, the NRF may provide the IP address or the FQDN or the identifier of relevant services and/or NF instance(s) to the requester NF for the target NF instance selection. Based on that identifying information, the requester NF may then select one specific NF instance or an NF instance that is able to provide a particular NF Service (e.g., an instance of the PCF that can provide Policy Authorization).

For roaming scenarios, in other words, where an NF in one PLMN is requesting services from an NF located in a different PLMN, communication between NFs of visited and home PLMNs is performed via SEPP (Security Edge Protection Proxy) nodes deployed in each PLMN. Two SEPPs of different PLMNs may communicate over an N32 reference point. The SEPP may be a non-transparent proxy, meaning that it may be directly addressed by the NFs. This is illustrated in FIG. 1.

FIG. 1 illustrates an example of SBA in two PLMNs. The first PLMN 101, which in this case is the visitor PLMN (VPLMN) comprises a number of network functions NFs. In this example the NFs illustrated are a Network Slice Selection Function (NSSF), a first Network Exposure Function (NEF), a NF Repository Function (NRF), a first Policy Control Function (PCF), an Application Function (AF), an Access and Mobility Management Function (AMF), a Session Management Function (SMF), and a User Plane Function (UPF). A User Equipment (UE) may then connect to this 5GC network via the Radio Access Network (RAN).

The second PLMN 102, which in this case comprises the home PLMN (hPLMN), may comprises one or more NFs. In this example, the NFs illustrated comprise a Unified Data Management (UDM) function an Authentication Server Function (AUSF), a second NF Repository Function (NRF), a second PCF and a second NEF.

Each network function may discover other NFs by looking them up in the NRF of their PLMN.

In a roaming scenario, a requesting NF in a first PLMN (for example, the AMF in the VPLMN in FIG. 1) that requires contact with a NF a different PLMN (for instance, the UDM in the HPLMN of FIG. 1) may first executes a procedure to discover the location of the NF in the VPLMN.

For example, the requesting NF in the first PLMN may contact the NRF in the first PLMN to perform a lookup for the requested NF in the second PLMN. In other words, for the above example, the AMF in the VPLMN performs a lookup for the UDM in the first NRF of the VPLMN.

The NRF in the first PLMN 101 may then contact the NRF in the second PLMN 102 using the vSEPP in the first PLMN 101 and the hSEPP in the second PLMC 102 as proxies.

The NRF in the second PLMN 102 may then return the information relating to the requested NF, e.g. the UDM in the second PLMN, back to the NRF in the first PLMN through the hSEPP and vSEPP proxies in the first PLMN 101 and second PLMN 102, respectively.

The NRF in the first PLMN 101 may then return the information to the requesting NF, e.g. the AMF in the first PLMN 101.

Once the requesting NF, e.g. the AMF, in the first PLMN 101 learns the location of the requested NF, e.g. the UDM, in the second PLMN, it may execute the desired service of the requested NF in the second PLMN 102.

For example, the requesting NF, e.g. the AMF, in the first PLMN 101 may contact the requested NF, e.g. the UDM, in the second PLMN using the vSEPP in the first PLMN 101 and the hSEPP in the second PLMN 102 as proxies.

The requested NF, e.g. the UDM, in the second PLMN may then execute the service and return a response to the requesting NF, e.g. the AMF, in the first PLMN 101 through the hSEPP and vSEPP proxies in the first and second PLMN 102, respectively.

Due to network topology hiding the NRF in the first PLMN 101 may provide to the requesting NF the IP address or the Fully Qualified Domain Name (FQDN) of a proxy function(s), for example the hSEPP, instead of providing the IP address of FQDN of the target instance(s) of the NF service producer within the HPLMN, i.e. the UDM itself. This may thereby hide the topology of the location of the UDM. The proxy function, e.g. the hSEPP, may be transparent to the requesting NF. The proxy function may then itself discover the location of the target NF instance via the local NRF, and forward service requests to the target NF instance.

A Split-horizon Domain Name System (DNS) refers to a functionality which may be implemented in a DNS server in which the address resolution of hostnames depends on the source address of the requesting NF. Split-Horizon DNS may commonly be used to offer separated domain resolutions, for example, to provide a different domain resolution for internal corporate requesting NFs and the external requesting NFs such as those from the public Internet. In other words, the split-horizon DNS may offer services under different IP addresses internally and externally.

Service discovery and service requesting in roaming scenarios occurs by utilizing the SEPP proxies of all PLMNs involved. It may therefore be necessary to force the routing of service requests across PLMNs via the corresponding SEPPs in the first and second PLMNs.

Among other functions, the SEPP may also be required to provide topology hiding. This means that NFs from other PLMNs interacting with NFs in the first PLMN may not be able to address NFs within the first PLMN directly, but rather may address a proxy function which is hiding the topology of the NFs, such as for example the SEPP in the first PLMN. It will however be appreciated that topology hiding may be realized in proxy functions other than the SEPP.

It may also be required that NFs within the first PLMN are able to access NFs which are also within the first PLMN directly without any topology hiding.

To achieve this, the NRF may provide for the registration of NFs with different addressing depending on the location of the requesting NF accessing the registered NF. For example, the NRF may provide an address of the NF, for requesting NFs that are accessing from the within same PLMN, and may provide an address of a node providing the topology hiding (such as the SEPP), for requesting NFs accessing from a different PLMN.

This means that an NRF is required to support a split-horizon setup for provisioning different set of addresses and the logic to serve the right set depending on the requesting NF and it complicates the provisioning of the NRF as it requires more information to be provisioned.

This may also affect the NFs that register themselves with the NRF, as they are required to provision different addresses, and to comprise logic to indicate whether the session they are requesting constitutes roaming.

SUMMARY

According to embodiments described herein there is provided a method, in a Network Function Discovery Orchestration, NFDO, node, for configuring a Service Based Architecture, SBA, of a first Public Land Mobile Network, PLMN, for discovery of a Network Function, NF. The method comprises configuring, in a domain name system, DNS, a first DNS entry associating a first domain name of the NF with at least one NF Internet Protocol, IP, address of the NF, and a second DNS entry associating the first domain name with at least one edge security node IP address of an edge security node in the first PLMN, wherein, the first DNS entry is for use in resolving requests for the NF which originate from within the first PLMN, and the second DNS entry is for use in resolving requests for the NF which originate from outside the first PLMN.

According to some embodiments there is provided a method, in a first Network Repository Function, NRF, within in a first Public Land Mobile Network, PLMN, for discovery of a second NF in a second Public Land Mobile Network, PLMN. The method comprises receiving a first discovery request from a first NF for the discovery of a second NF; determining that the second NF is within a second PLMN; determining a second NRF domain name associated with a second NRF in the second PLMN, transmitting, to a domain name system, DNS, an address request for an IP address associated with the second NRF; receiving the IP address; forwarding the discovery request to the IP address; and receiving a first discovery response comprising a first domain name associated with the second NF.

According to some embodiments there is provided a method, in a Domain Name System, DNS, in a first Public Land Mobile Network, PLMN. The method comprises receiving an address request from a first Network Function, NF, for an Internet Protocol, IP, address associated with a domain name of a second NF; determining whether the second NF is within the first PLMN; and based on the determination, generating an address response comprising an IP address associated with the second NF.

According to some embodiments there is provided a method, in a first edge security node of a first Public Land Mobile Network, PLMN. The method comprises receiving, from a first network function, NF, a request for a second NF, determining whether the second NF is within the first PLMN; and responsive to the second NF not being within the first PLMN, generating a first address request for the second NF; and transmitting the first address request to a domain name system, DNS, within the first PLMN from an external interface of the first edge security node located outside of the first PLMN.

According to some embodiments there is provided a Domain Name Server in a first Public Land Mobile Network, PLMN. The DNS comprises a first DNS entry associating a first domain name of a Network Function, NF, with at least one NF Internet Protocol, IP, address of the NF, and a second DNS entry associating the first domain name with at least one edge security node IP address of an edge security node in the first PLMN, wherein, the first DNS entry is for use in resolving requests for the NF which originate from within the first PLMN, and the second DNS entry is for use in resolving requests for the NF which originate from outside the first PLMN.

According to some embodiments there is provided a Network Function Discovery Orchestration, NFDO, node, for configuring a Service Based Architecture, SBA, of a first Public Land Mobile Network, PLMN, for discovery of a Network Function, NF. The NFDO node comprises processing circuitry configured to configure, in a domain name system, DNS, a first DNS entry associating a first domain name of the NF with at least one NF Internet Protocol, IP, address of the NF, and a second DNS entry associating the first domain name with at least one edge security node IP address of an edge security node in the first PLMN, wherein, the first DNS entry is for use in resolving requests for the NF which originate from within the first PLMN, and the second DNS entry is for use in resolving requests for the NF which originate from outside the first PLMN.

According to some embodiments there is provided a first Network Repository Function, NRF, within in a first Public Land Mobile Network, PLMN, for discovery of a second NF in a second Public Land Mobile Network, PLMN. The first NRF comprises processing circuitry configured to receive a first discovery request from a first NF for the discovery of a second NF; determine that the second NF is within a second PLMN; determine a second NRF domain name associated with a second NRF in the second PLMN, transmit, to a domain name system, DNS, an address request for an IP address associated with the second NRF; receive the IP address; forward the discovery request to the IP address; and receive a first discovery response comprising a first domain name associated with the second NF.

According to some embodiments there is provided a Domain Name System, DNS, in a first Public Land Mobile Network, PLMN. The DNS comprises processing circuitry configured to receive an address request from a first Network Function, NF, for an Internet Protocol, IP, address associated with a domain name of a second NF; determine whether the second NF is within the first PLMN; and based on the determination, generate an address response comprising an IP address associated with the second NF.

According to some embodiments there is provided a first edge security node of a first Public Land Mobile Network, PLMN. The first edge security node comprises processing circuitry configured to receive, from a first network function, NF, a request for a second NF, determine whether the second NF is within the first PLMN; and responsive to the second NF not being within the first PLMN, generate a first address request for the second NF; and transmit the first address request to a domain name system, DNS, within the first PLMN from an external interface of the first edge security node located outside of the first PLMN.

BRIEF DESCRIPTION OF THE FIGURES

For a better understanding of the embodiments of the present disclosure, and to show how it may be put into effect, reference will now be made, by way of example only, to the accompanying drawings, in which.

DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Embodiments described herein relate to methods and apparatus for configuring a Service Based Architecture, SBA, of a first Public Land Mobile Network, PLMN, in for discovery of a Network Function, NF. In particular embodiments described herein allows for the NFs to be registered based on the Fully Qualifying Domain Names (FQDN) of the NFs, and a provisioning of the DNS service in the PLMN in a split horizon setup, binding the FQDN of each NF to both the NF addressing (for requests from the same PLMN) and the SEPP addressing (for requests from other PLMNs).

Embodiments described herein also introduce a NF Discovery Orchestration (NFDO) function that advantageously simplifies the orchestration of the NF discovery by configuring the NF with an FQDN to be used when registering the NF in the NRF, gathering the IP addressing information of the NF and the SEPP and using the IP addressing information to provision the DNS service in the PLMN with a split horizon setup. This means that each NF is not required to comprise logic to indicate whether the session they are requesting constitutes roaming, nor is each NF required to provide at least two different types of addressing information to the NRF.

The embodiments disclosed herein therefore enable transparent routing of the different NFs (including the NRF) for both non-roaming and roaming scenarios with the following advantages. Firstly, the individual NFs do not need to implement dedicated discovery and routing logic for the roaming scenarios. This means that the interaction with the NRF and SEPP occurs transparently to the NF in roaming scenarios. Furthermore, the NFs do not need to register with the NRF with a plurality of different addresses for the roaming and non-roaming scenarios to induce routing via SEPPs and/or to support topology hiding. The NRF does not need to support separated NF addressing provisioning and logic for roaming and non-roaming scenarios. The overall provisioning of the 5G Core NFs is simplified by using domain names, e.g. FQDNs, as opposed to using a potentially large (and dynamic over time) set of IP addresses. The overall provisioning of the 5G Core NFs is simplified even further using an NF Discovery Orchestration (NFDO) Function, which eliminates the problems associated to the one-time registration of a NF composed of a potentially large number of individual instances.

Figure 1:
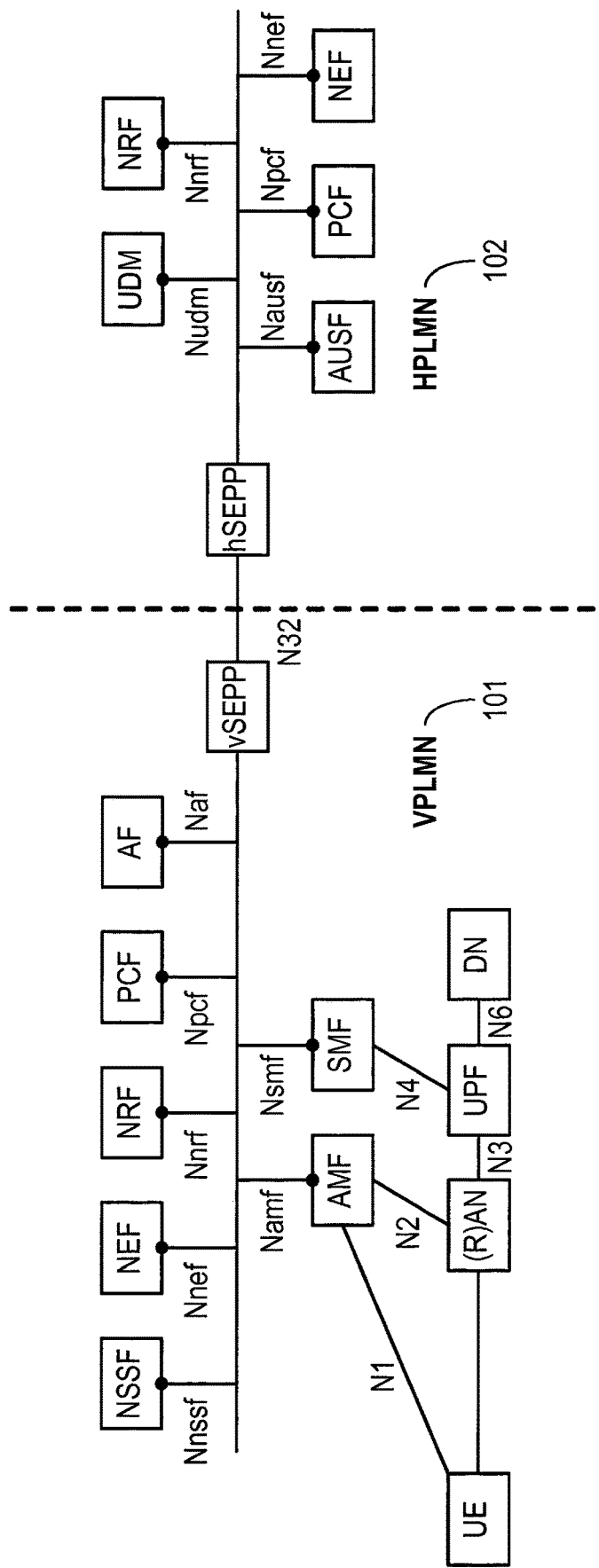
FIG. 1 illustrates an example of Service Based Architecture (SBA) in two Public Land Mobile Networks (PLMNs)
Figure 2:
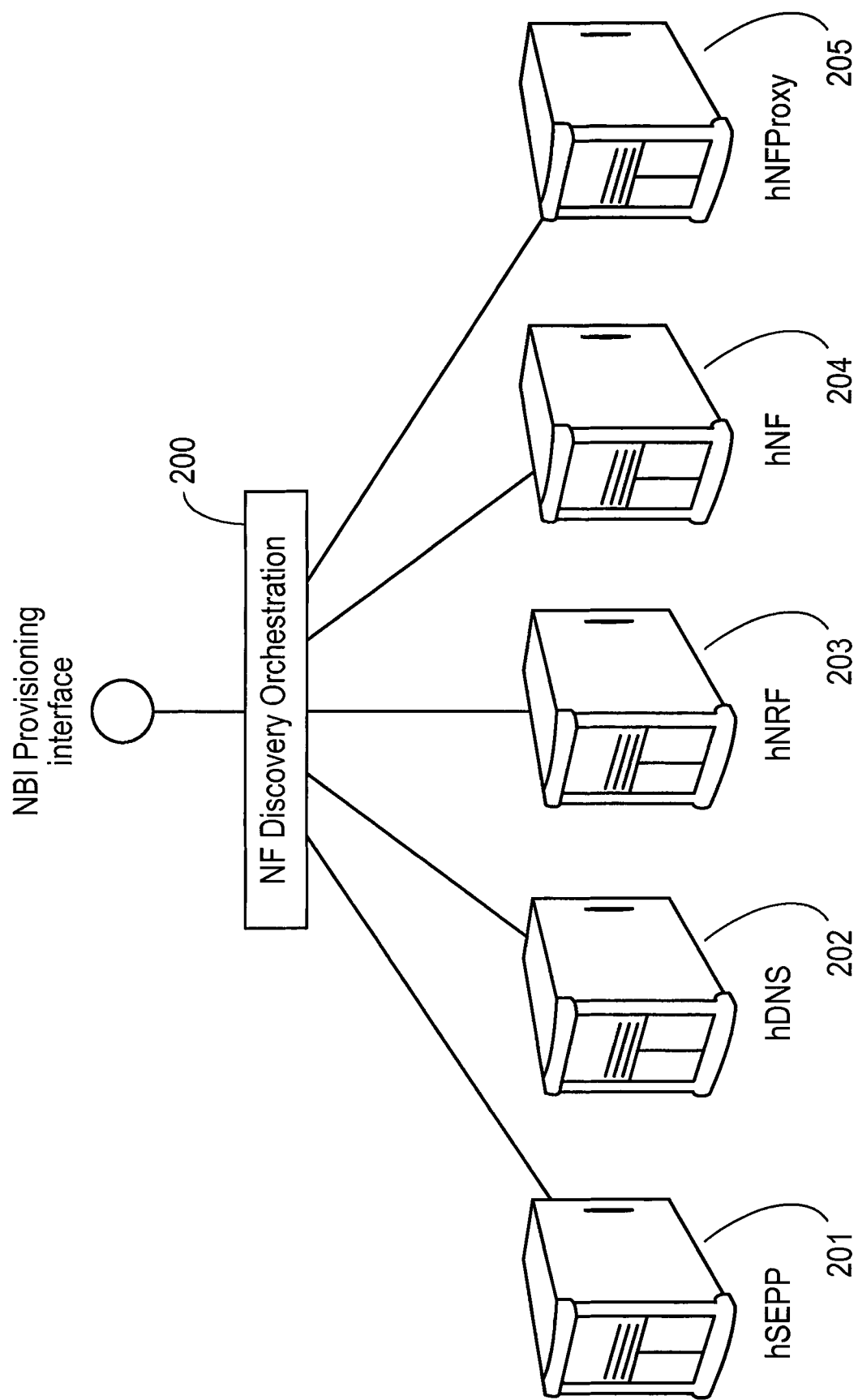
FIG. 2 illustrates the service based architecture of a Public Land Mobile Network (PLMN) according to embodiments described herein.

FIG. 2 illustrates the service based architecture of a Public Land Mobile Network (PLMN) according to embodiments described herein.

An NF Discovery Orchestration (NFDO) function 200 provides orchestration of the NF discovery by orchestrating the registering of the NFs on the NRF 203 with the other network elements that are required for the proper realization of the NF discovery. The NFDO may be realized as a separate node as illustrated, which may be physical or virtualized, or may be part of a broader orchestration system, for instance, orchestrating the whole 5G core.

The NFDO scope may be that of a single PLMN, and may not require that other PLMNs have a NFDO for its proper operation.

The NFDO 200 in the PLMN may interact with a edge security node, for example a Security Edge Protection Proxy (hSEPP) 201, in order to manage the SEPP address(es) of the external interface of the hSEPP 201 which communicates with other PLMNs. The NFDO 200 also communicates with the hNRF Proxy 205, which comprises an optional proxy node that provides topology hiding of the NFs in the PLMN, in order to learn the NFs hidden by the proxy and the addresses of the proxy. The NFDO 200 may also communicate with the Domain Name System (hDNS) function 202, in order to provision the FQDN and IP addresses of the NFs, considering the split-horizon setup. The NFDO may also communicate with the hNRF 203, in order to register any NFs which are not configured to provide registration themselves. The NFDO may also communicate with the different NFs 204 in order to configure the details of the NF addressing and the registering of each NF in the hNRF 203.

The network elements described above with relation to FIG. 2 may be physical, virtual, or a combination of both.

The NFDO provides a northbound interface (NBI) that may be in communication with other orchestration systems.

Figure 3:
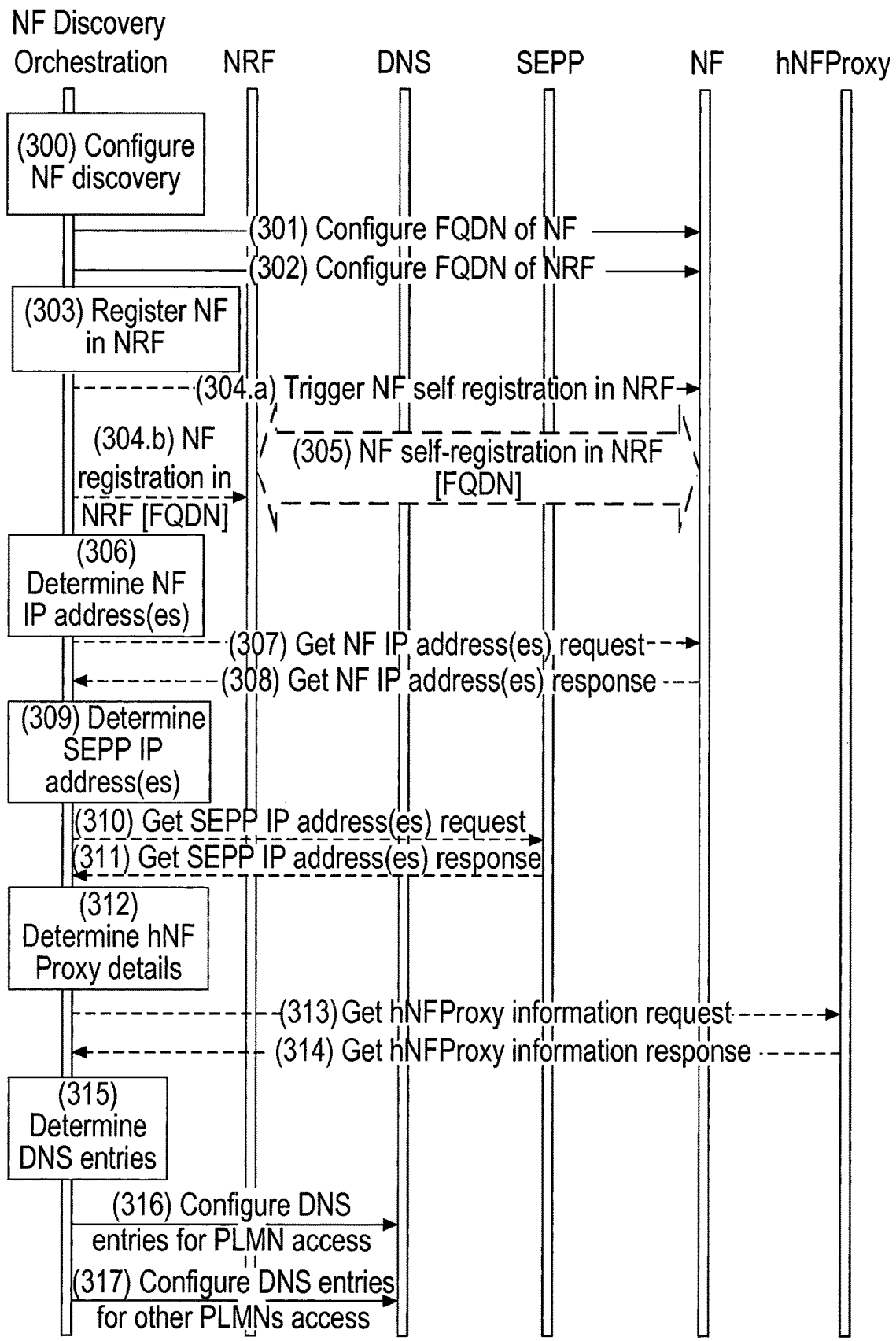
FIG. 3 illustrates an example of a process for registering NFs in the NRF according to some embodiments.

When an NF is deployed, the NFDO orchestrates the configuration of the entities that it interacts with. Within the overall orchestration flow for the deployment of a NF, the orchestration flow described in FIG. 3 is executed. The steps illustrated in FIG. 3 may occur in the final steps of the NF deployment orchestration.

FIG. 3 illustrates an example of a process for registering NFs in the NRF according to some embodiments.

In step 300 the NFDO begins the configuration of the discovery for a NF.

In step 301, the NFDO transmits an indication of a first domain name to be used by the NF. For example, the first domain name may comprise an Fully Qualified Domain Name (FQDN) to be used by the NF. In some examples, step 301 may further comprise the NFDO transmitting an indication of a second domain name associated with the NRF in the PLMN to the NF. For example, the second domain name may comprise an FQDN associated with the NRF.

In step 303 the NFDO may initiate registration of the NF in the Network Repository Function, NRF such that the NF is associated with the first domain name in the NRF. Depending on the NF capabilities, or the configuration set by the operator, the NF may register itself in the NRF. In this example, in step 304a the NFDO may transmit a registration request to the NF to instruct the NF to register the first domain name with the NRF. In this example, the NF may then register the first domain name with the NRF in step 305.

In some examples, however, the NFDO may register the NF in the NRF directly in step 304b. In both examples, the NF is registered with one or more first domain names, which may comprise FQDNs, instead of IP addresses.

In step 306, the NFDO determines the at least one NF Internet Protocol, IP, address of the NF. In some examples, the NF IP address may comprise virtual IP address (VIP) providing a single point of access, or a list of IP addresses. In some examples, the NFDO may know the IP addresses in advance or may transmit a first address request to the NF for the at least one NF IP address in step 307 and may receive the NF IP address from the NF in step 308.

In step 309 the NFDO determines at least one edge security node (e.g. SEPP), IP address. For example, the NFDO may determine the IP address of the SEPP in step 308. The at least one edge security node IP address may comprise a VIP providing a single point of access, or a list of IP addresses. The NFDO may already be aware of the at least one edge security node IP address in advance or may transmit a second address request to the edge security node (in this example the SEPP) for the at least one edge security node IP address in step 310 and may receive the at least one edge security node IP address in step 311.

Optionally, if a topology hiding proxy is used, the NFDO may determine at least one IP address of the proxy (hNRF-Proxy), the FQDN of the proxy, and the NFs that the proxy is performing topology hiding for in step 312. The NFDO may already be aware of this information or may transmit a request to the proxy for the information in step 313 and receive the information from the proxy in step 314.

The NFDO may then determine in step 315 what data to provision to the DNS server serving the PLMN. For example, the NFDO may utilize the at least one NF IP address determined in step 306, the at least one edge security node IP address determined in step 309, and/or the proxy information determined in step 312 to configure DNS entries to be used for resolution by NFs within the same PLMN in step 316, and DNS entries to be used for resolution by NFs from other PLMN in step 317. This will be described in more detail with respect to FIG. 4 below.

In particular, the NFDO may therefore be configured to configure, in a domain name system, DNS, a first DNS entry associating a first domain name of the NF with at least one NF Internet Protocol, IP, address of the NF, and a second DNS entry associating the first domain name with at least one edge security node IP address of an edge security node in the first PLMN, wherein, the first DNS entry is for use in resolving requests for the NF which originate from within the first PLMN, and the second DNS entry is for use in resolving requests for the NF which originate from outside the first PLMN. In other words, the first DNS entry may be configured in step 316 and the second DNS entry may be configured in step 317.

Figure 4:
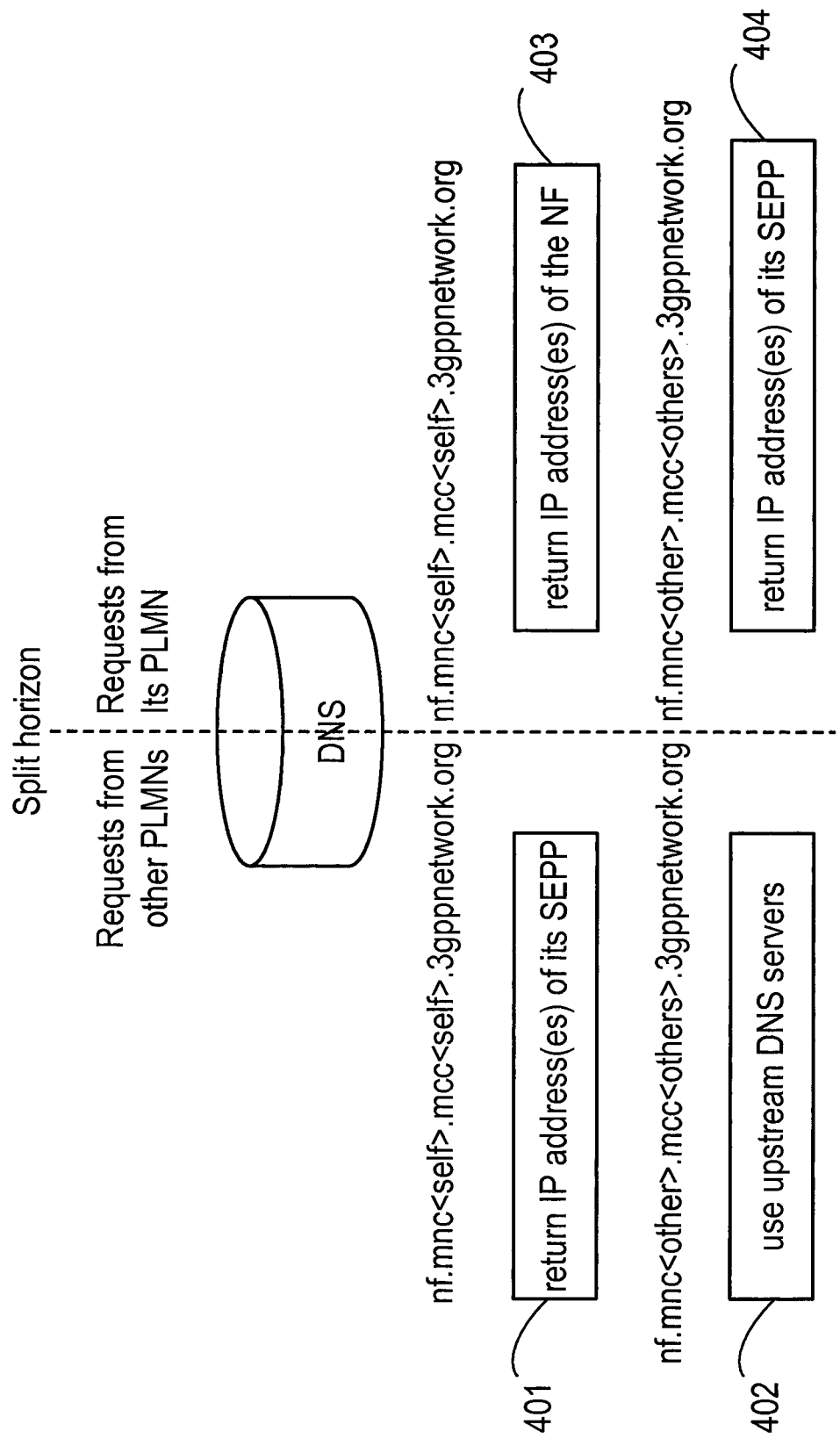
FIG. 4 the provisioning of the DNS server serving a first PLMN as it is configured by the NFDO.

FIG. 4 illustrates the provisioning of the DNS server serving a first PLMN as it is configured by the NFDO as described above.

As illustrated in FIG. 4, the DNS may be configured such that there are at least two DNS entries for each NF. DNS entries 401 and 402 may be configured for use in processing DNS requests that originate from outside of the first PLMN, for example, requests coming from NFs which are located in other PLMNs.

Conversely, DNS entries 403 and 404 may be configured for use in processing DNS requests that originated from within the first PLMN, for example, requests originating from NFs within the same PLMN as the DNS.

It will be appreciated that the FQDNs illustrated in the example of FIG. 4 are illustrative.

For each NF in the first PLMN, the NFDO may provide, for DNS requests that originate from within the first PLMN, a first DNS entry 403 associating the first domain name of the NF with at least one NF IP address (VIP) or list of IP addresses that the NF is listening at, and are to be used by other NFs that are in the first PLMN. This corresponds to the DNS entry named nf<name>.mnc<self>.mcc<self>.3gppnetwork.org in FIG. 4 and step 312 in FIG. 3.

The NFDO may also provide, for DNS requests that originate from outside of the first PLMN of the DNS, a second DNS entry 401 associating the first domain name of the NF with the at least one edge security node IP address (VIP) or list of IP addresses of the SEPP or the, hNFProxy, the network element doing the topology hiding. This second DNS entry may be used by NFs in other PLMNs. This corresponds to the DNS entry named nkname>.mnc<self>.mcc<self>.3gppnetwork.org in FIG. 4 and step 313 in FIG. 3.

For example, the NFDO may also provide, for DNS requests that originate from within the first PLMN which are for NFs which are not within the first PLMN, a third DNS entry 404 for each of the different PLMNs that the first PLMN communicates with. The third entry may comprise one DNS entry per PLMN and NF, in other words an entry indicating the PLMN for each requested NF outside the first PLMN. If using a proxy for topology hiding (hNFProxy), the proxy itself may be registered instead of the individual NFs it hides.

Alternatively, the third entry may comprise one entry per PLMN which uses wildcards (*) to match all the NFs in the PLMN to the request. In other words, any FDQN which has the structure comprising the wildcard, for example, *.mnc<self>.mcc<self>.3gppnetwork.org would be mapped to the third entry for the PLMN outside of the first PLMN.

The third entries in the DNS may then be associated with the at least one edge security node IP address.

The NFDO may then further provide a fourth DNS entry 402 configured to delegate the domain name resolution to different PLMNs that the NFDO interacts with. This entry may be utilized where the request is received from a NF in a second PLMN, and the request is for a second NF in a third PLMN, where the DNS is part of the first PLMN. The fourth entries 402 may comprise one entry per PLMN and NF. If using a proxy for topology hiding (hNFProxy), the proxy itself may be registered instead of the individual NFs it hides. Alternatively, the fourth entries 402 may comprise one entry per PLMN, using wildcards (*) to match all the NFs in the PLMN. This corresponds to the entries named *.mnc<self>.mcc<self>.3gppnetwork.org in FIG. 4.

Figure 5:
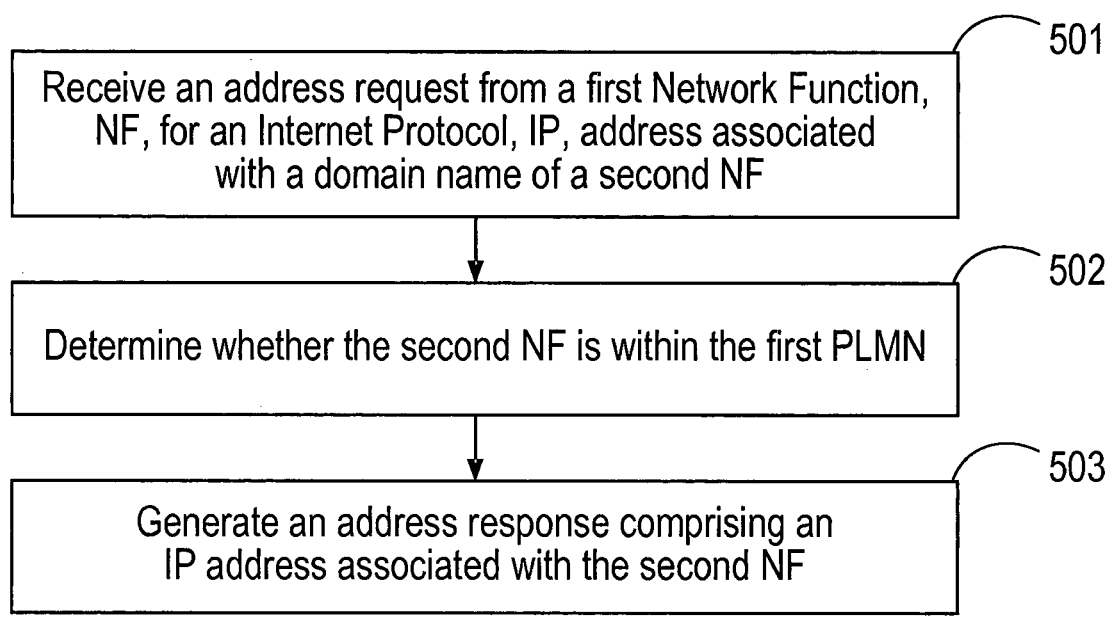
FIG. 5 illustrates a method, in a Domain Name System, DNS, in a first Public Land Mobile Network, PLMN, according to some embodiments.

FIG. 5 illustrates a method, in a Domain Name System, DNS, in a first Public Land Mobile Network, PLMN.

In step 501, the DNS receives an address request from a first Network Function, NF, for an Internet Protocol, IP, address associated with a domain name of a second NF.

In step 502, the DNS determines whether the second NF is within the first PLMN.

In step 503, based on the determination, the DNS generates an address response comprising an IP address associated with the second NF.

In some examples, step 503 is further based on whether the first NF is within the first PLMN.

In some examples, responsive to the second NF and the first NF being within the first PLMN, step 503 comprises generating the address response comprising the IP address of the second NF. This example is as described with respect to DNS entry 403 in FIG. 4

In some examples, responsive to the second NF being within the first PLMN, and the first NF not being within the first PLMN; step 503 comprises generating the address response comprising the IP address of a first edge security node of the first PLMN. This example is as described with respect to DNS entry 401 in FIG. 4

In some examples, responsive to the first NF being within the first PLMN, and the second NF not being within the first PLMN, step 503 comprises generating the address response comprising the IP address of a first edge security node in the first PLMN. This example is as described with respect to DNS entry 404 in FIG. 4.

In some examples, responsive to the neither first NF or the second NF being within the first PLMN; step 503 comprises generating the address response comprising the IP address of a second edge security node in a different PLMN to the first PLMN. This example is as described with respect to DNS entry 402 in FIG. 4

Figure 6:
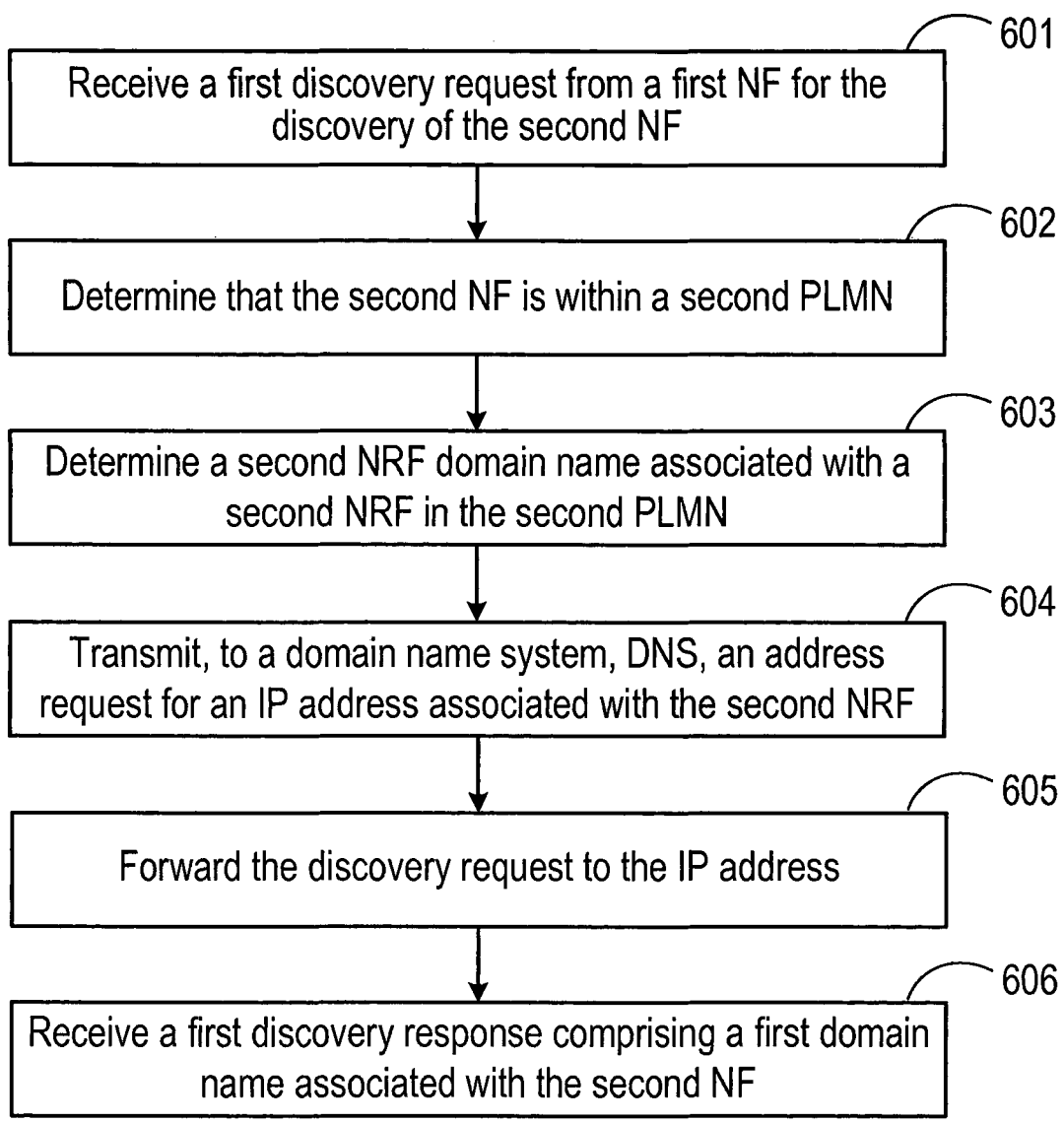
FIG. 6 illustrates a method in a first Network Repository Function, NRF, within in a first Public Land Mobile Network, PLMN, for discovery of a second NF in a second Public Land Mobile Network, PLMN, according to some embodiments.

FIG. 6 illustrates a method in a first Network Repository Function, NRF, within in a first Public Land Mobile Network, PLMN, for discovery of a second NF in a second Public Land Mobile Network, PLMN.

In step 601, the first NRF receives a first discovery request from a first NF for the discovery of the second NF.

In step 602, the first NRF determines that the second NF is within a second PLMN.

In step 603 the first NRF determines a second NRF domain name associated with a second NRF in the second PLMN.

In step 604, the first NRF, transmits, to a domain name system, DNS, an address request for an IP address associated with the second NRF.

In step 605, the first NRF, receives the IP address. The IP address may comprise a edge security node IP address of an edge security node in the first PLMN capable of forwarding the discovery request either to the second PLMN or a third PLMN in closer communication with the second PLMN.

In step 606, the first NRF, forwards the discovery request to the IP address.

In step 607, the first NRF receives a first discovery response comprising a first domain name associated with the second NF. In some examples, the first domain name comprises a domain name of the second NF. In some examples, the first domain name comprises a domain name of the second NF.

In some examples, the first NRF may then forward the first discovery response to the first NF.

In some examples, the first NRF may be configured to receive a second discovery request from a third NF within the first PLMN for the discovery of a fourth NF in the first PLMN; and generate a second discovery response comprising a second domain name associated with the fourth NF; and transmit the second discovery response to the third NF. The second domain name may comprise one of a domain name of the fourth NF, and a domain name of a second proxy NF performing topology hiding of the fourth NF. In other words, if the received discovery request is for a NF in the same PLMN as the NRF, the NRF may respond with the stored domain name associated with the requested NF which was stored during registration of the requested NF, as described above in

FIG. 3.

Figure 7:
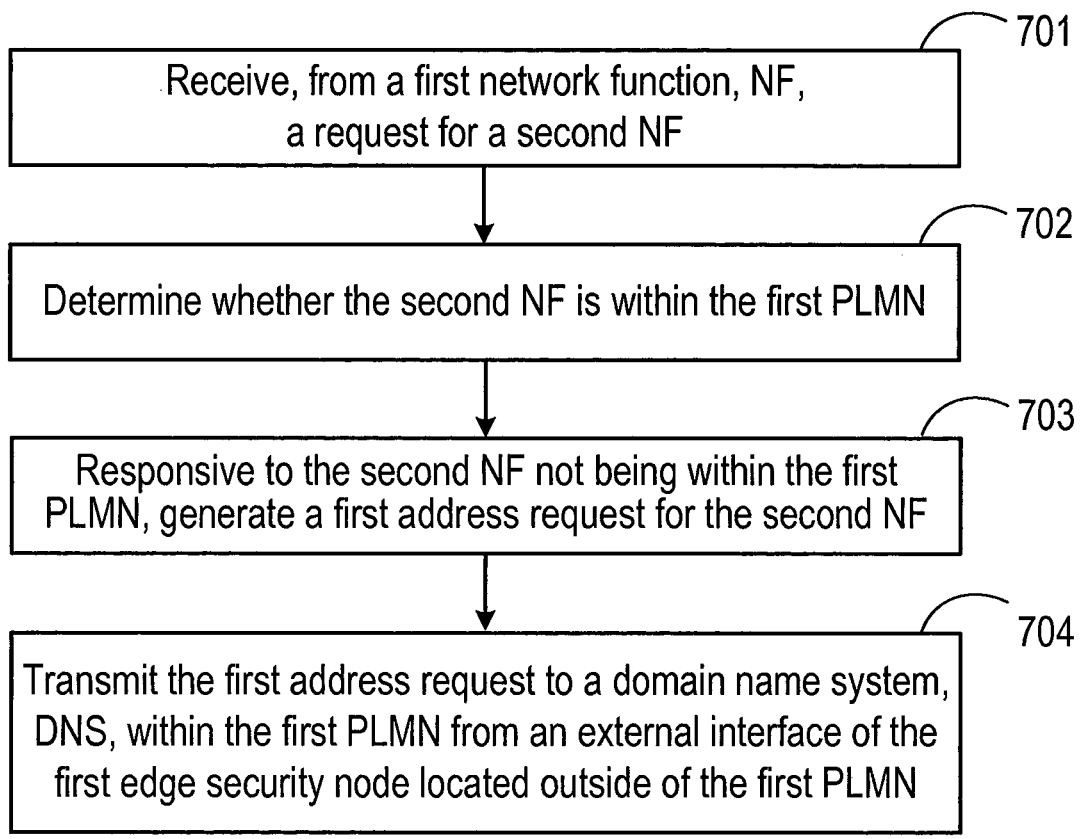
FIG. 7 illustrates a method, in a first edge security node of a first Public Land Mobile Network, PLMN, according to some embodiments.

FIG. 7 illustrates a method, in a first edge security node of a first Public Land Mobile Network, PLMN.

In step 701, the first edge security node receives, from a first network function, NF, a request for a second NF.

In step 702, the first edge security node determines whether the second NF is within the first PLMN.

In step 703, responsive to the second NF not being within the first PLMN, the first edge security node generates a first address request for the second NF.

In step 704 the first edge security node transmits the first address request to a domain name system, DNS, within the first PLMN from an external interface of the first edge security node located outside of the first PLMN.

In some examples, responsive to transmitting the first address request, first edge security node receives a first address response comprising an IP address of a second edge security node in a second PLMN.

In some examples, responsive to the second NF being within the first PLMN, first edge security node generates a second address request for the second NF and transmits the second address request to the DNS from an internal interface of the first edge security node. In some examples, responsive to transmitting the second address request, first edge security node receives a second address response comprising an IP address of the second NF.

In other words, the SEPP is configured, when it receives a request for an NF which is outside of the PLMN of the SEPP, to sends an address request to the DNS using the external interface of the SEPP. In this way, the DNS will view the address request as having originated from outside of the PLMN, and the DNS may therefore respond accordingly as illustrated in FIG. 4.

Conversely, when the SEPP receives an address request for an NF which is within the first PLMN, the SEPP may transmit an address request for the second NF to the DNS using an internal interface of the SEPP. In this way the DNS will view the address request as having originated from within the PLMN and will respond accordingly as illustrated in FIG. 4.

The request may comprise either a discovery request to discover a domain name of the second NF, or a service request to request service from the second NF.

Figure 8:
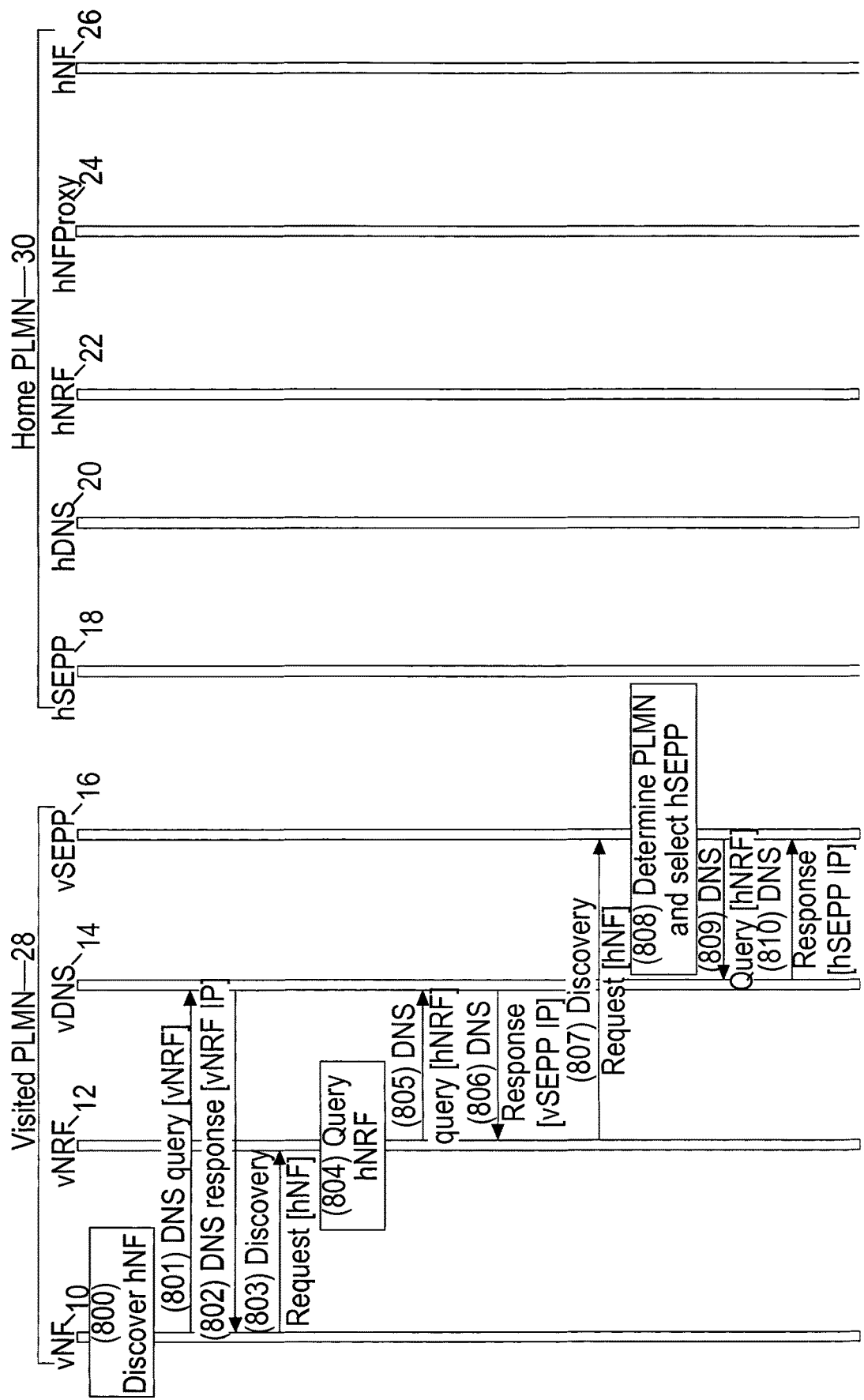
FIG. 8 illustrates an example of an NF service discovery signaling flow for a roaming scenario where the requested NF is not in the same PLMN as the requesting NF, according to some embodiments.
Figure 8:
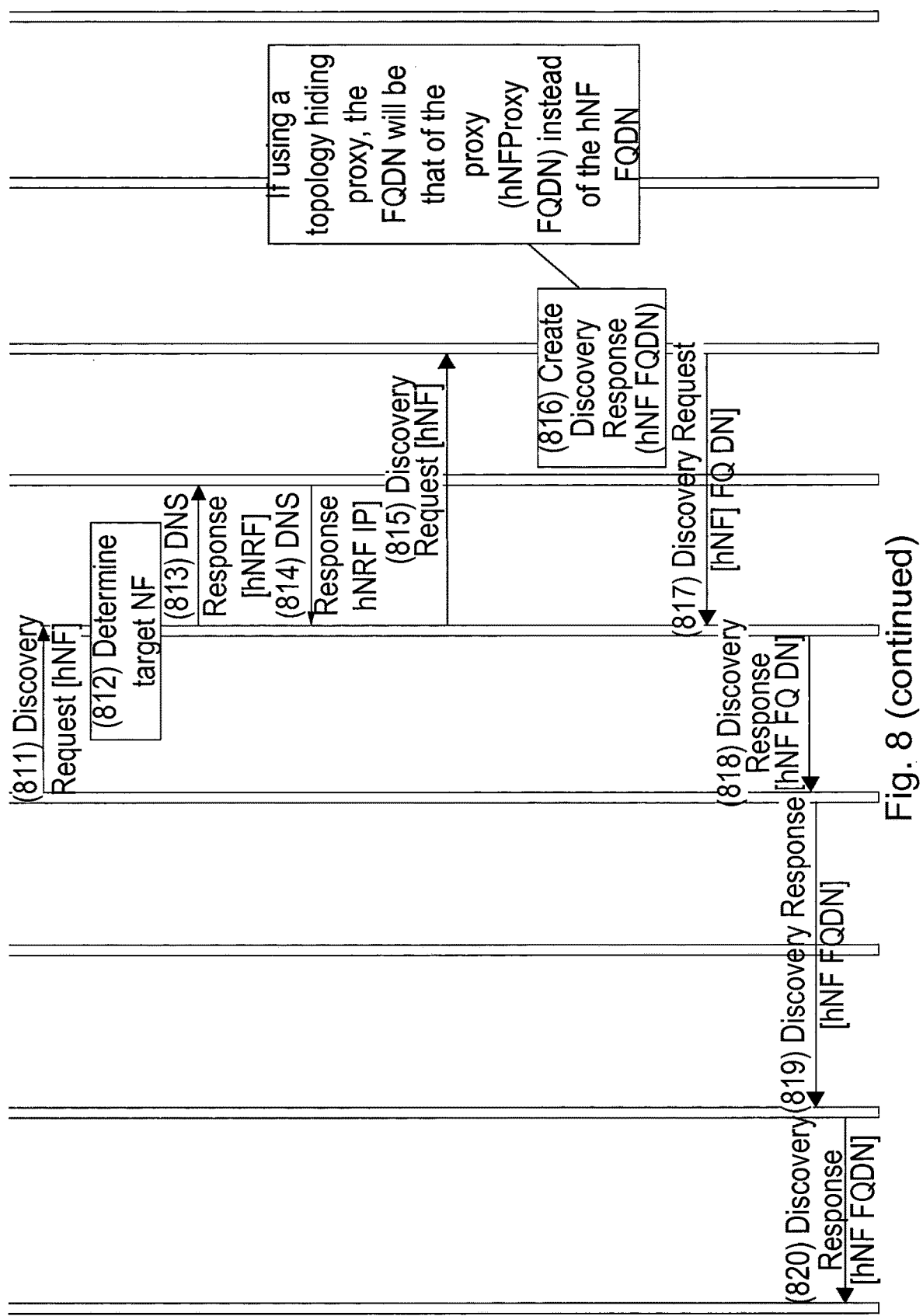

FIG. 8 illustrates an example of an NF service discovery signaling flow for a roaming scenario where the requested NF is not in the same PLMN as the requesting NF.

In step 801 a first NF 10 in the first PLMN 28 determines that a service from a second NF 26 is required. The first NF 10 then transmits a discovery request to the first DNS 14 in the first PLMN 28 to discover the location of the second NF 26 by interacting with first NRF 12 in the first PLMN 28. The first DNS 14 may be configured to operate as described with reference to FIG. 5.

The first NF 10 therefore transmits in step 801, a discovery request to the first DNS 14 for the IP address of the first NRF 12 in the first PLMN 28. The first DNS 14 may then respond to the first NF 10 in step 802 with the IP address of the first NRF 12. The first DNS 14 is in this example using the entry 403 illustrated in FIG. 4 as the request originated from within the same PLMN, for an NF (i.e. the first NRF) also within the same PLMN.

In step 803, the first NF 10 transmits a discovery request to the first NRF 12 for the second NF 26. The first NRF 12 may be configured to operate as described with respect to FIG. 6. The first NRF 12 may then determine, in step 804, that the second NF 26 is in the second PLMN 30 and may determine a domain name of the second NRF 22 in the second PLMN 30. In step 605, the first NRF 12 transmits a request to the first DNS 14 for an IP address associated with the domain name of the second NRF 22. The first NRF 12 may use vendor-specific mechanisms or provisioning data for this purpose.

In this occasion, as the request is from within the first PLMN 28, i.e. from the first NRF 12, but is for a NF, i.e. the second NRF 26, which is located outside of the first PLMN 28, the first DNS 14 uses the DNS entry 401 and responds to the first NRF 12 in step 806 with the IP address of the first SEPP 16.

In step 807 the first NRF 12 forwards the discovery request for the second NF 26 received from the first NF 10 to the IP address received in step 606, i.e. the IP address of the first SEPP 16. The first SEPP 16 may be configured to operate as described with respect to FIG. 7. The discovery request sent to the first SEPP 16 for the second NF 26 may comprise a header set to the domain name of the second NRF 22.

In step 808 the first SEPP 16 determines that the discovery request is for an NF in the second PLMN 30. The first SEPP 16 may determine the second PLMN 30 by inspecting the header of the discovery request to extract the domain name of the second NRF 22.

In step 809, the first SEPP 16 may then transmit an address request to the first DNS 14 from an external interface of the first SEPP 16 located outside of the first PLMN 28. In this example, the first SEPP 16 uses the external interface as the second NF 26 is located outside of the first PLMN 28. The address request may comprise the domain name of the second NRF 22 which was part of the header of the discovery request received by the first SEPP 16 in step 807.

The first DNS 14, as the address request received in step 809 is sent from the external interface of the first SEPP 16 will treat the request as having originated from outside of the first PLMN 28. The address request of step 809 is therefore originating from outside the first PLMN 28 for a NF also located outside of the first PLMN 28. The first DNS 14, as described in FIG. 4, therefore transmits an address response back to the first SEPP 16 in step 810 comprising an IP address of second SEPP 18 of the second PLMN 30. The second SEPP 18 may be configured to operate similarly to the first SEPP 16 as described in FIG. 7.

The first SEPP 16 may then forward the discovery request to the second SEPP 18 using the IP address received in step 811. The discovery request forwarded to the second SEPP 18 may comprise a header set to the domain name of the second NRF 22. In step 812, the second SEPP 18 may inspect the header of the discovery request received in step 811 and determines the second NRF 22 domain name.

The second SEPP 18 may then use a second DNS 20 in the second PLMN 30 to resolve the domain name of the second NRF 22. For example, the second SEPP 18 may transmit an address request to the second DNS 20 comprising the domain name of the second NRF in step 813. The second DNS 20 may be configured to operate similarly to the first DNS 14 as described in FIG. 5.

The second DNS 20 may then use receive the address request in step 813 and, as the address request originated from within the same PLMN as the second DNS 20 and is a request for an NF (the second NRF) which is also in the same PLMN, the second DNS may respond with the IP address of the second NRF 22 in step 814.

The second SEPP 18 may then transmit a discovery request for the second NF 26 to the second NRF 22 in step 815. The second NRF 22 may be configured to operate similarly to the first NRF 12 as described in FIG. 6. The second NRF 22 may analyze the received discovery request in step 816. The second NF 26 may be registered in the second NRF 22 at it is in the same PLMN, i.e. the second PLMN 30. The second NRF 22 may therefore transmit a discovery response in step 817 comprising the domain name of the second NF 26 which was registered during registration of the second NF 26.

In some examples, a proxy function 24 may be providing topology hiding for the second NF 26. In these examples, the discovery response may comprise the domain name of the proxy function 24. The discovery response may then be transmitted back to the first NF 10 in steps 818, 819 and 820.

In this example therefore, the first NF 10 simply sends a discovery request for the second NF 26 and receives in response a discovery response in step 820. The first NF 10 does not therefore need to indicate that the second NF 26 is in a different PLMN to the first PLMN 28. In other words, the first NF 10 need not be aware of whether the discover request constitutes a roaming scenario.

Figure 9:
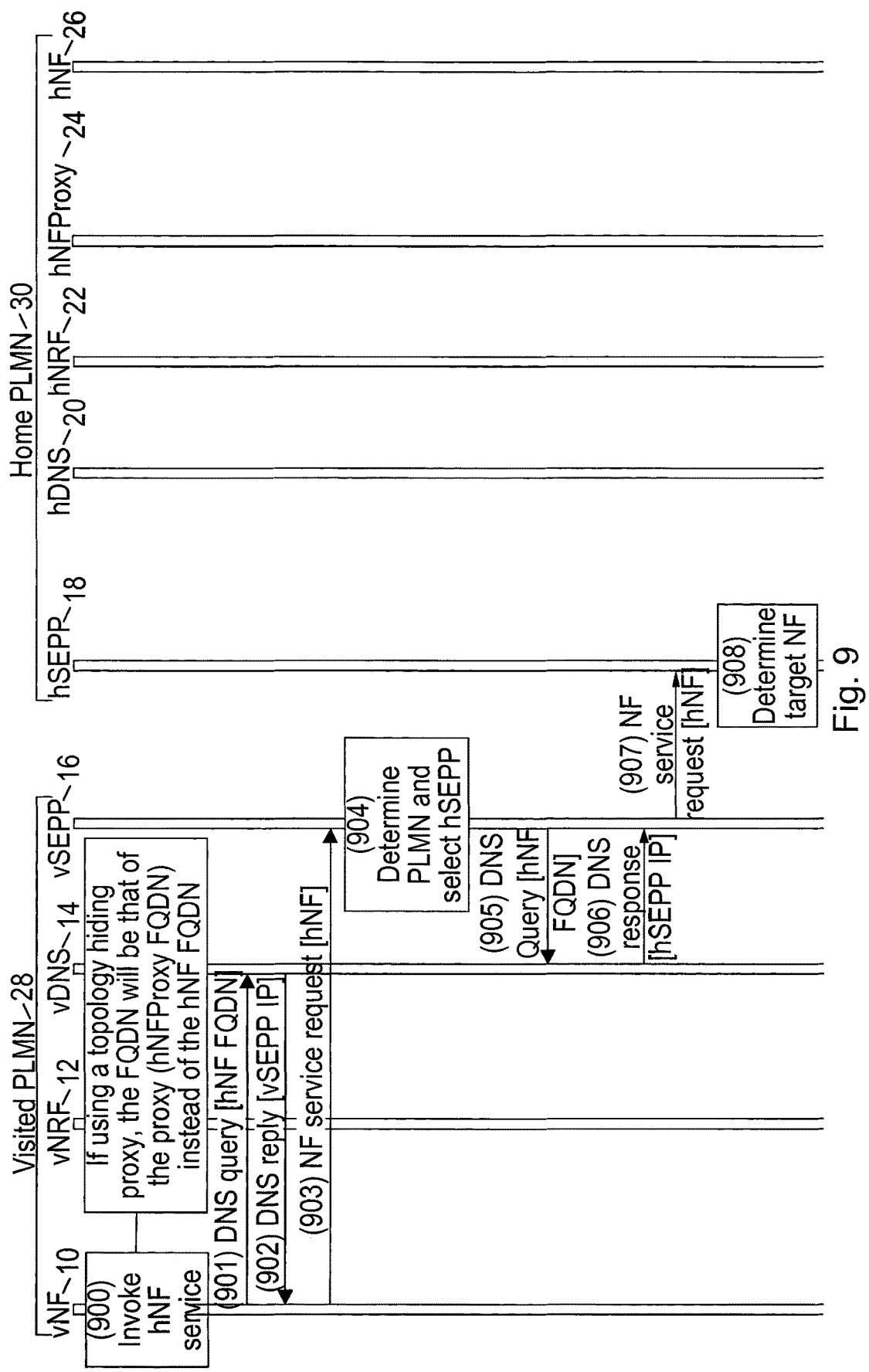
FIG. 9 illustrates an example of NF service request signaling flow for a roaming scenario, according to some embodiments.
Figure 9:
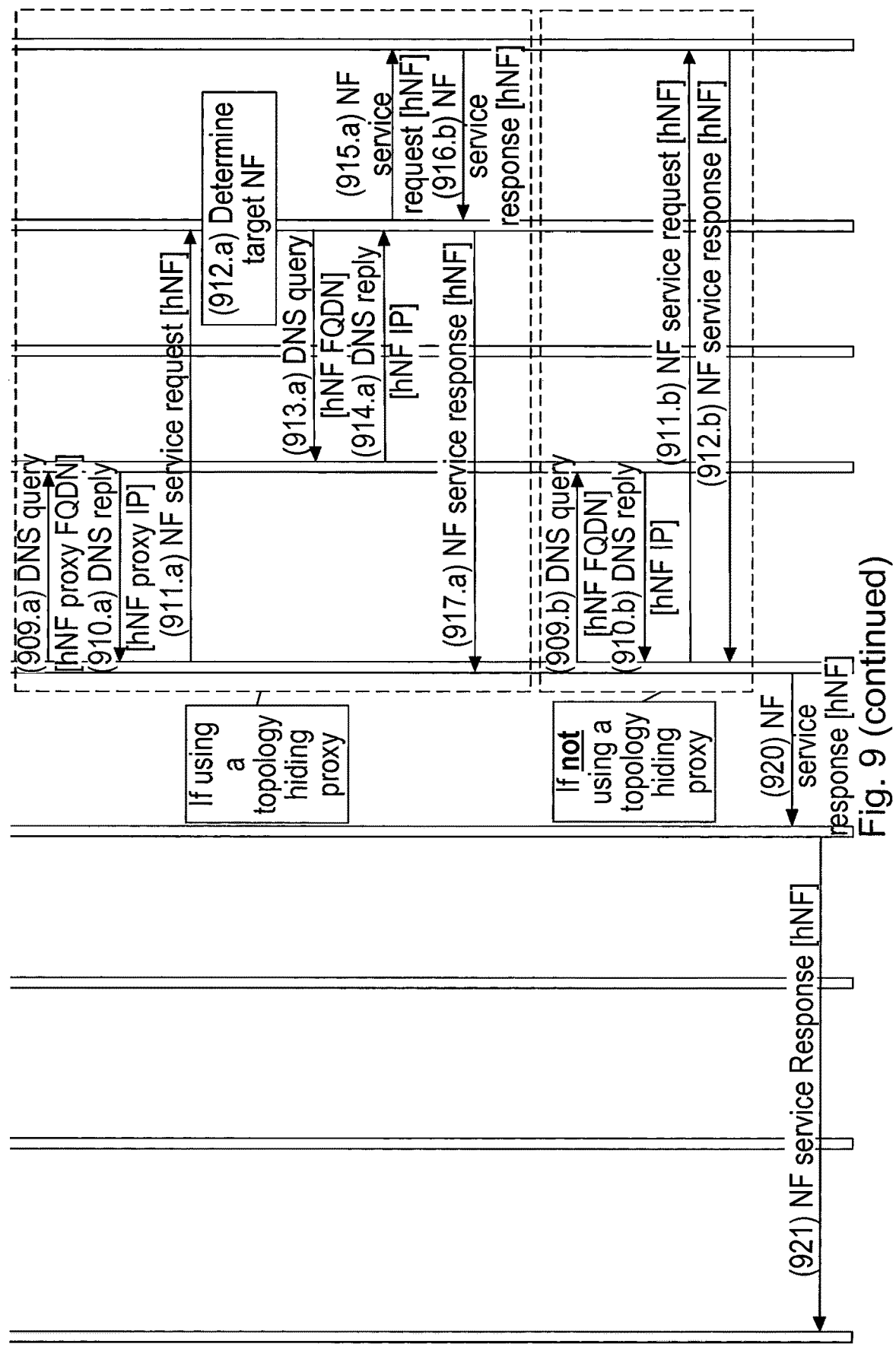

FIG. 9 illustrates an example of NF service request signaling flow for a roaming scenario.

Once the second NF 26 (or the proxy function 24 realizing topology hiding for the second NF) is discovered by the first NF 10, the first NF 10 may invoke a service from the second NF 26 in step 900.

The first NF 10 may first transmit an address request to the first DNS 14 to resolve the domain name of the second NF 26 or the proxy function 24 in step 901. The domain name of the second NF 26 or the proxy function 24 may be as received in the discovery response in step 820 of FIG. 8.

The first DNS 14 may then, as the address request of step 901 was for a NF which is outside of the first PLMN, transmit a response in step 902 to the first NF 10 comprising the IP address of the first SEPP 16.

The first NF 10 may the transmit in step 903 a service request for the second NF 26 to the first SEPP 16 using the IP address received in step 902.

The service request may comprise a header set to the domain name of the second NF 26 or the proxy function 24. The first SEPP 16 may then inspect the header of the service request in step 904 and may extract the domain name of the second NF 26 or the proxy function 24.

The first SEPP 16 may then use the first DNS 14 to resolve the domain name of the second NF 26 or the proxy function 24. For example, the first SEPP 16 may transmit an address request to the first DNS 14 for the second NF 26 using the external interface of the first SEPP 16. As illustrated in FIG. 7, the first SEPP 16 uses the external interface here as the second NF 26 is located outside of the first PLMN 28.

The first DNS 14 may then transmit a response to the first SEPP 16 comprising the IP address of the second SEPP in 906.

The first SEPP 16 may then transmit the service request or the service from the second NF to the second SEPP 18 in step 907. The service request may comprise a header set to the domain name of the second NF 26 or the proxy function 24. The second SEPP 18 may inspect the header of service request in step 908 and determines the NF to address.

If topology hiding is applicable, i.e. the server request comprises a header set to the domain name of the proxy function 24, then steps 909a to 917a may be performed.

In step 909a, the second SEPP 18 uses the second DNS 20 to resolve the domain name of the proxy function 24. The second DNS 20 may, as illustrated in FIG. 4, transmit an address response to the second SEPP 18 comprising the IP address of the proxy function 24 in step 910a.

In step 911a the second SEPP 18 may then transmit the service request to the IP address of the proxy function 24. The service request may comprise a header set to the domain name of the proxy function 24.

As the header of the service request comprises the domain name of the proxy function, the proxy function may not be able to determine the NF to address from inspecting the service request. The proxy function 24 may therefore, determine the domain name of the second NF 26 in step 212a by for example, inspecting the Request-URI of the service request and inferring the second NF 26 from the Request-URI. In some examples, an additional lookup on the second NRF 22 made by the proxy function 24 may be required (not depicted).

The proxy function 24 may then utilize the second DNS 20 to resolve the domain name of the second NF 26. For example, the proxy function 24 may transmit an address request to the second DNS for the address of the second NF 26 in step 913a. The second DNS 20 may the respond with the IP address of the second NF 26 in step 914a.

The proxy function 24 may then transmit the service request to the second NF 26 in step 915a.

The second NF 26 may then return a service response in step 916a, which traverses the proxy function 24 in reverse order up to the second SEPP 18 in step 917a.

If no topology hiding is used steps 909b to 912b are performed. The second SEPP 18 uses the second DNS 20 to resolve the domain name of the second NF. For example, in 909b, the second SEPP 18 transmits an address request to the second DNS for the address of the second NF 26. The second DNS 18 responds in step 210b with the IP address of the second NF 26.

The second SEPP 18 may then transmit the service request to the second NF 26 in step 911. The second NF 26 returns a service response 912b to the second SEPP 18.

Once the second SEPP receives the service response, either in step 912b or 917a, it transmits the service response back to the first SEPP 16 in step 920 which in turns transmits the service response to the first NF in step 921.

Figure 10:
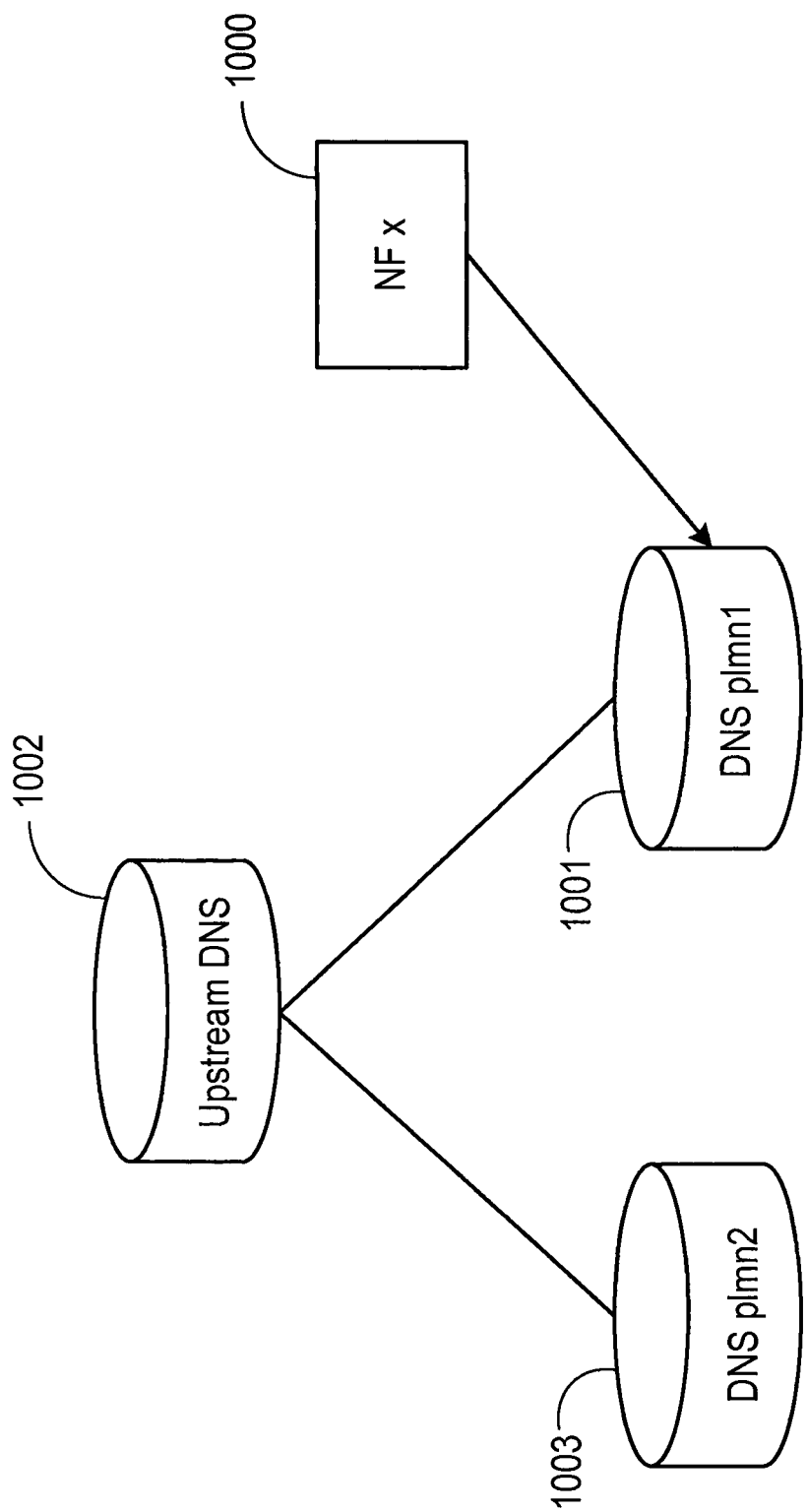
FIG. 10 illustrates communication between a plurality of PLMNs according to some embodiments.

FIG. 10 illustrates communication between a plurality of PLMNs according to some embodiments. For example, if a NF 1000 in a first PLMN 1001 requests discovery or a service from a second NF located in a third PLMN 1003 which the SEPP in the first PLMN 1001 is not capable of communicating with, the first PLMN 1001 may pass the request to a second PLMN 1002, which is closer communication with the third PLMN 1003. The second PLMN 1002 may then pass the request on to the third PLMN 1003 (using DNS entry 402 as illustrated in FIG. 4) where the requested NF may be discovered, or the service may be requested.

Figure 11:
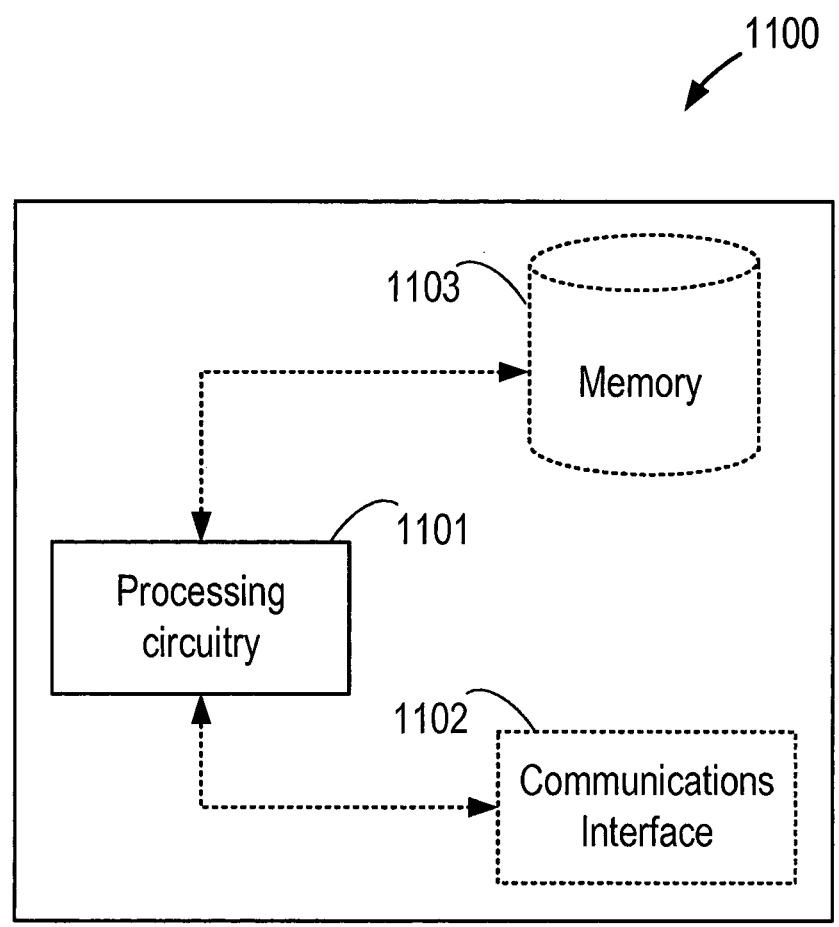
FIG. 11 illustrates a Network Function Discovery Orchestration (NFDO) node according to some embodiments.

FIG. 11 illustrates a Network Function Discovery Orchestration (NFDO) node 1100 comprising processing circuitry (or logic) 1101. The processing circuitry 1101 controls the operation of the NFDO node 1100 and can implement the method described herein in relation to a NFDO node 1100. The processing circuitry 1101 can comprise one or more processors, processing units, multi-core processors or modules that are configured or programmed to control the NFDO node 1100 in the manner described herein. In particular implementations, the processing circuitry 1101 can comprise a plurality of software and/or hardware modules that are each configured to perform, or are for performing, individual or multiple steps of the method described herein in relation to the NFDO node 1100.

Briefly, the processing circuitry 1101 of the NFDO node 1100 is configured to configure, in a domain name system, DNS, a first DNS entry associating a first domain name of the NF with at least one NF Internet Protocol, IP, address of the NF, and a second DNS entry associating the first domain name with at least one edge security node IP address of an edge security node in the first PLMN, wherein, the first DNS entry is for use in resolving requests for the NF which originate from within the first PLMN, and the second DNS entry is for use in resolving requests for the NF which originate from outside the first PLMN.

In some embodiments, the NFDO node 1100 may optionally comprise a communications interface 1102. The communications interface 1102 of the NFDO node 1100 can be for use in communicating with other nodes, such as other virtual nodes. For example, the communications interface 1102 of the NFDO node 1100 can be configured to transmit to and/or receive from other nodes requests, resources, information, data, signals, or similar. The processing circuitry 1101 of the NFDO node 1100 may be configured to control the communications interface 1102 of the NFDO node 1100 to transmit to and/or receive from other nodes requests, resources, information, data, signals, or similar.

Optionally, the NFDO node 1100 may comprise a memory 1103. In some embodiments, the memory 1103 of the NFDO node 1100 can be configured to store program code that can be executed by the processing circuitry 1101 of the NFDO node 1100 to perform the method described herein in relation to the NFDO node 1100. Alternatively or in addition, the memory 1103 of the NFDO node 1100, can be configured to store any requests, resources, information, data, signals, or similar that are described herein. The processing circuitry 1101 of the NFDO node 1100 may be configured to control the memory 1103 of the NFDO node 1100 to store any requests, resources, information, data, signals, or similar that are described herein.

Figure 12:
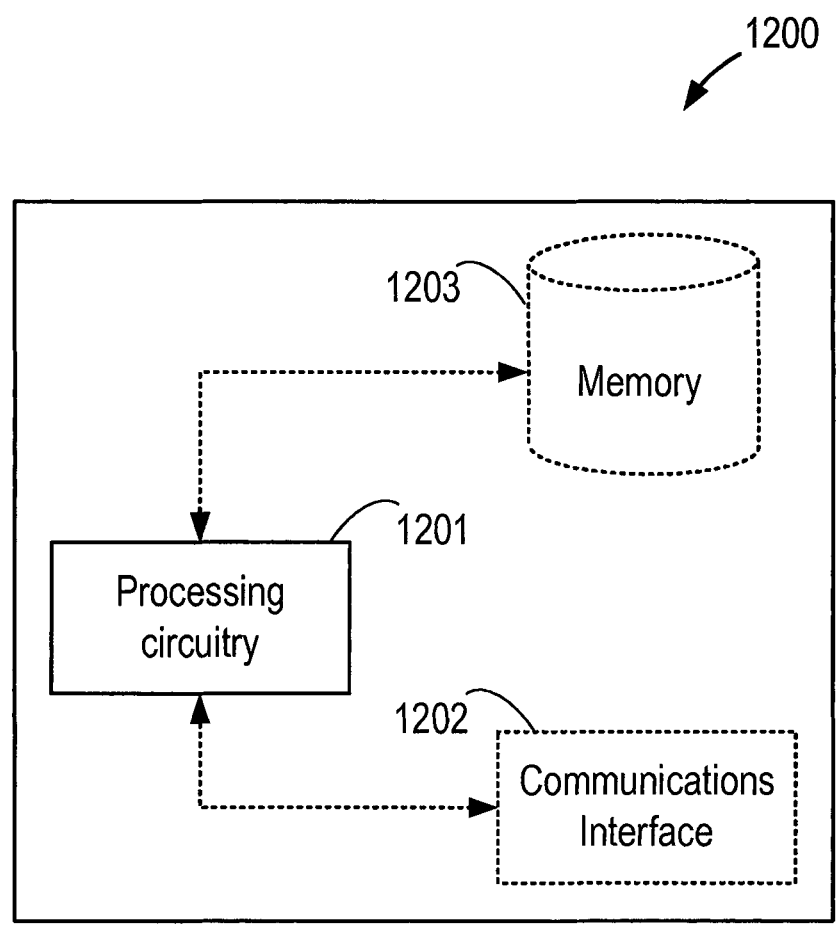
FIG. 12 illustrates a first Network Repository Function (NRF) according to some embodiments.

FIG. 12 illustrates a first Network Repository Function (NRF) 1200 comprising processing circuitry (or logic) 1201. The processing circuitry 1201 controls the operation of the first NRF 1200 and can implement the method described herein in relation to a first NRF 1200. The processing circuitry 1201 can comprise one or more processors, processing units, multi-core processors or modules that are configured or programmed to control the first NRF 1200 in the manner described herein. In particular implementations, the processing circuitry 1201 can comprise a plurality of software and/or hardware modules that are each configured to perform, or are for performing, individual or multiple steps of the method described herein in relation to the NRF 1200.

Briefly, the processing circuitry 1201 of the first NRF 1200 is configured to receive a first discovery request from a first NF for the discovery of a second NF; determine that the second NF is within a second PLMN; determine a second NRF domain name associated with a second NRF in the second PLMN, transmit, to a domain name system, DNS, an address request for an IP address associated with the second NRF; receive the IP address; forward the discovery request to the IP address; and receiving a first discovery response comprising a first domain name associated with the second NF.

In some embodiments, the first NRF 1200 may optionally comprise a communications interface 1202. The communications interface 1202 of the first NRF 1200 can be for use in communicating with other nodes, such as other virtual nodes. For example, the communications interface 1202 of the first NRF 1200 can be configured to transmit to and/or receive from other nodes requests, resources, information, data, signals, or similar. The processing circuitry 1201 of the first NRF 1200 may be configured to control the communications interface 1202 of the first NRF 1200 to transmit to and/or receive from other nodes requests, resources, information, data, signals, or similar.

Optionally, the first NRF 1200 may comprise a memory 1203. In some embodiments, the memory 1203 of the first NRF 1200 can be configured to store program code that can be executed by the processing circuitry 1201 of the first NRF 1200 to perform the method described herein in relation to the first NRF 1200. Alternatively or in addition, the memory 1203 of the first NRF 1200, can be configured to store any requests, resources, information, data, signals, or similar that are described herein. The processing circuitry 1201 of the first NRF 1200 may be configured to control the memory 1203 of the first NRF 1200 to store any requests, resources, information, data, signals, or similar that are described herein.

Figure 13:
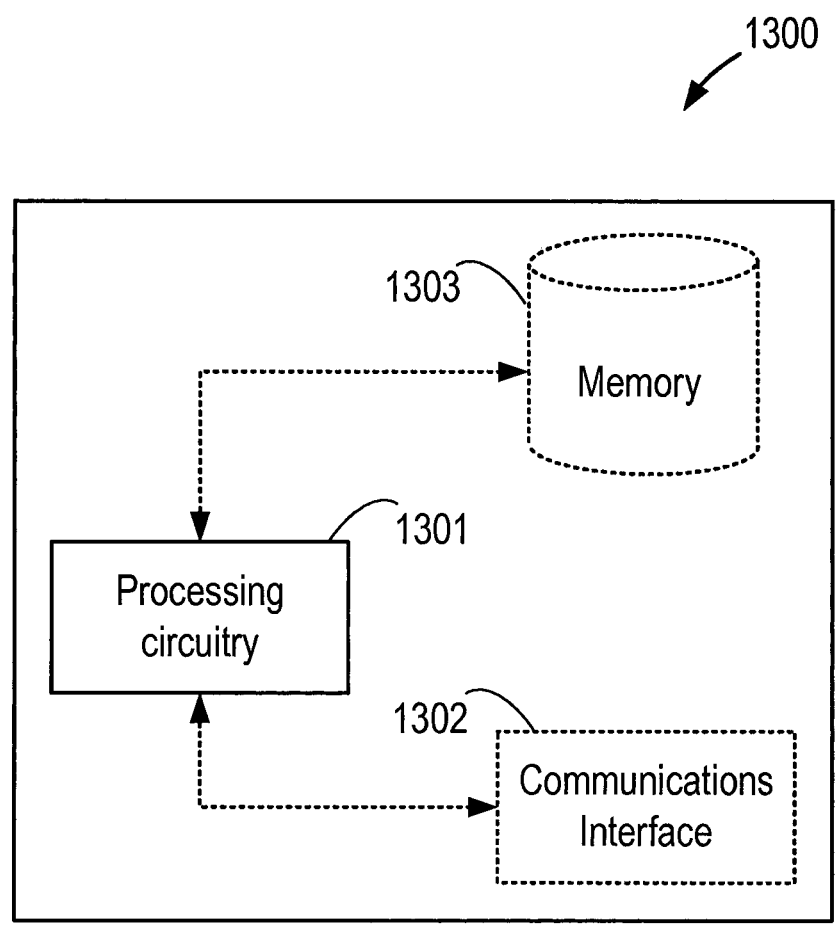
FIG. 13 illustrates a Domain Name System (DNS) according to some embodiments.

FIG. 13 illustrates a Domain Name System (DNS) 1300 comprising processing circuitry (or logic) 1301. The processing circuitry 1301 controls the operation of the DNS 1300 and can implement the method described herein in relation to a DNS 1300. The processing circuitry 1301 can comprise one or more processors, processing units, multi-core processors or modules that are configured or programmed to control the DNS 1300 in the manner described herein. In particular implementations, the processing circuitry 1301 can comprise a plurality of software and/or hardware modules that are each configured to perform, or are for performing, individual or multiple steps of the method described herein in relation to the DNS 1300.

Briefly, the processing circuitry 1301 of the DNS 1300 is configured to receive an address request from a first Network Function, NF, for an Internet Protocol, IP, address associated with a domain name of a second NF; determine whether the second NF is within the first PLMN; and based on the determination, generate an address response comprising an IP address associated with the second NF.

In some embodiments, the DNS 1300 may optionally comprise a communications interface 1302. The communications interface 1302 of the DNS 1300 can be for use in communicating with other nodes, such as other virtual nodes. For example, the communications interface 1302 of the DNS 1300 can be configured to transmit to and/or receive from other nodes requests, resources, information, data, signals, or similar. The processing circuitry 1301 of the DNS 1300 may be configured to control the communications interface 1302 of the DNS 1300 to transmit to and/or receive from other nodes requests, resources, information, data, signals, or similar.

Optionally, the DNS 1300 may comprise a memory 1303. In some embodiments, the memory 1303 of the DNS 1300 can be configured to store program code that can be executed by the processing circuitry 1301 of the DNS 1300 to perform the method described herein in relation to the DNS 1300. Alternatively or in addition, the memory 1303 of the DNS 1300, can be configured to store any requests, resources, information, data, signals, or similar that are described herein. The processing circuitry 1301 of the DNS 1300 may be configured to control the memory 1303 of the DNS 1300 to store any requests, resources, information, data, signals, or similar that are described herein.

Figure 14:
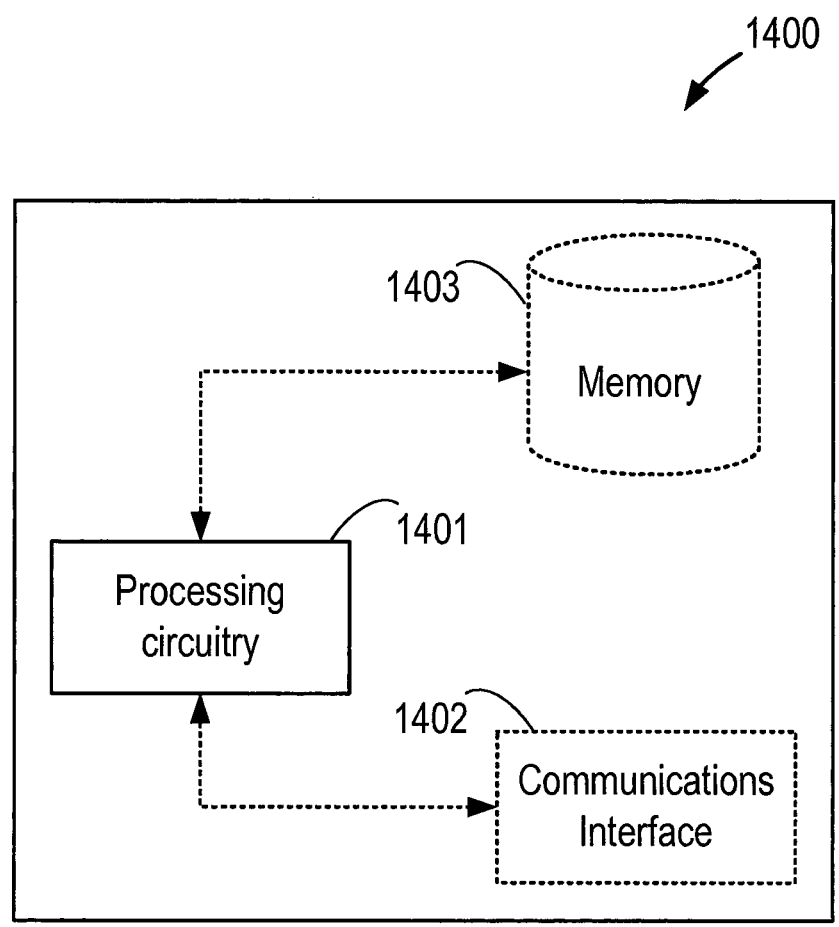
FIG. 14 illustrates a first edge security node according to some embodiments.

FIG. 14 illustrates a first edge security node 1400 comprising processing circuitry (or logic) 1401. The processing circuitry 1401 controls the operation of the first edge security node 1400 and can implement the method described herein in relation to a first edge security node 1400. The processing circuitry 1401 can comprise one or more processors, processing units, multi-core processors or modules that are configured or programmed to control the first edge security node 1400 in the manner described herein. In particular implementations, the processing circuitry 1401 can comprise a plurality of software and/or hardware modules that are each configured to perform, or are for performing, individual or multiple steps of the method described herein in relation to the first edge security node 1400.

Briefly, the processing circuitry 1401 of the first edge security node 1400 is configured to receive, from a first network function, NF, a request for a second NF, determine whether the second NF is within the first PLMN; and responsive to the second NF not being within the first PLMN, generate a first address request for the second NF; and transmit the first address request to a domain name system, DNS, within the first PLMN from an external interface of the first edge security node located outside of the first PLMN.

In some embodiments, the first edge security node 1400 may optionally comprise a communications interface 1402. The communications interface 1402 of the first edge security node 1400 can be for use in communicating with other nodes, such as other virtual nodes. For example, the communications interface 1402 of the first edge security node 1400 can be configured to transmit to and/or receive from other nodes requests, resources, information, data, signals, or similar. The processing circuitry 1401 of the first edge security node 1400 may be configured to control the communications interface 1402 of the first edge security node 1400 to transmit to and/or receive from other nodes requests, resources, information, data, signals, or similar.

Optionally, the first edge security node 1400 may comprise a memory 1403. In some embodiments, the memory 1403 of the first edge security node 1400 can be configured to store program code that can be executed by the processing circuitry 1401 of the first edge security node 1400 to perform the method described herein in relation to the first edge security node 1400. Alternatively or in addition, the memory 1403 of the first edge security node 1400, can be configured to store any requests, resources, information, data, signals, or similar that are described herein. The processing circuitry 1401 of the first edge security node 1400 may be configured to control the memory 1403 of the first edge security node 1400 to store any requests, resources, information, data, signals, or similar that are described herein.

There is therefore provided methods and apparatus in a Service Based Architecture, SBA, of a first Public Land Mobile Network, PLMN, for enabling NF requests using roaming and non-roaming scenarios.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method, in a Network Function Discovery Orchestration, NFDO, node, for configuring a Service Based Architecture, SBA, of a first Public Land Mobile Network, PLMN, for discovery of a Network Function, NF, the method comprising:
   transmitting an indication of a first domain name to be used by the NF;
   initiating registration of the NF in a Network Repository Function, NRF such that the NF is associated with the first domain name in the NRF;
   determining at least one NF Internet Protocol, IP, address;
   determining at least one edge security node IP address;
   configuring, in a domain name system, DNS, a first DNS entry associating the first domain name of the NF with the at least one NF Internet Protocol, IP, address of the NF, and a second DNS entry associating the first domain name with the at least one edge security node IP address of an edge security node in the first PLMN; and
   the first DNS entry being used for resolving requests for the NF which originate from within the first PLMN, and the second DNS entry being used for resolving requests for the NF which originate from outside the first PLMN.

2. The method as claimed in claim 1, wherein the initiating registration of the NF in the NRF comprises registering the NF in the NRF alongside the first domain name.

3. The method as claimed in claim 1, further comprising:
   transmitting an indication of a second domain name associated with the NRF, and wherein the initiating registration of the NF in the NRF comprises:
      transmitting a registration request to the NF to instruct the NF to register the first domain name with the NRF.

4. The method as claimed in claim 1, wherein the step of determining at least one NF IP address associated with the NF comprises:
   transmitting a first address request to the NF for the NF IP address, and
   receiving the at least one NF IP address from the NF.

5. The method as claimed in claim 1, wherein the step of determining at least one Security Edge Protection Proxy, SEPP, Internet Protocol, IP, address associated with an SEPP node comprises:
   transmitting a second address request to the SEPP node for the SEPP IP address; and
   receiving the at least one SEPP IP address from the SEPP.

6. A Network Function Discovery Orchestration, NFDO, node, for configuring a Service Based Architecture, SBA, of a first Public Land Mobile Network, PLMN, for discovery of a Network Function, NF, the NFDO node comprising processing circuitry configured to:
   transmit an indication of a first domain name to be used by the NF;
   initiate registration of the NF in a Network Repository Function, NRF such that the NF is associated with the first domain name in the NRF;
   determine at least one NF Internet Protocol, IP, address;
   determine at least one edge security node IP address;
   configure, in a domain name system, DNS, a first DNS entry associating the first domain name of the NF with at least one NF IP address of the NF, and a second DNS entry associating the first domain name with the at least one edge security node IP address of an edge security node in the first PLMN; and
   the first DNS entry being configured to be used for resolving requests for the NF which originate from within the first PLMN, and the second DNS entry being configured to be used for resolving requests for the NF which originate from outside the first PLMN.

\* \* \* \* \*